No. 851,215. PATENTED APR. 23, 1907.
H. E. BEACH & C. E. GIERDING.
B. B. BEACH, ADMINISTRATOR OF H. E. BEACH, DEC'D.
STREET OR STATION INDICATOR.
APPLICATION FILED JULY 29, 1903. RENEWED MAR. 2, 1906.

WITNESSES:
Geo. H. Richards
F. A. Field Berry

INVENTORS:
Harry E. Beach
Charles E. Gierding
BY
Fred H. Fraentzel
ATTORNEY

No. 851,215. PATENTED APR. 23, 1907.
H. E. BEACH & C. E. GIERDING.
B. B. BEACH, ADMINISTRATOR OF H. E. BEACH, DEC'D.
STREET OR STATION INDICATOR.
APPLICATION FILED JULY 29, 1903. RENEWED MAR. 2, 1906.

WITNESSES:

INVENTORS:
Harry E. Beach
Charles E. Gierding
BY
Fred K. Fraentzel
ATTORNEY

No. 851,215. PATENTED APR. 23, 1907.
H. E. BEACH & C. E. GIERDING.
B. B. BEACH, ADMINISTRATOR OF H. E. BEACH, DEC'D.
STREET OR STATION INDICATOR.
APPLICATION FILED JULY 29, 1903. RENEWED MAR. 2, 1906.

WITNESSES:

INVENTORS:
Harry E. Beach,
Charles E. Gierding
BY
Fred K. Fraentzel,
ATTORNEY No. 851,215.   
PATENTED APR. 23, 1907.
H. E. BEACH & C. E. GIERDING.
B. B. BEACH, ADMINISTRATOR OF H. E. BEACH, DEC'D.

STREET OR STATION INDICATOR.

APPLICATION FILED JULY 29, 1903. RENEWED MAR. 2, 1906.

WITNESSES:
Geo. D. Richards
F. A. Feldkamp

INVENTORS:
Harry E. Beach
Charles E. Gierding
BY
Fred K. Fraentzel
ATTORNEY

No. 851,215. PATENTED APR. 23, 1907.
H. E. BEACH & C. E. GIERDING.
B. B. BEACH, ADMINISTRATOR OF H. E. BEACH, DEC'D.
STREET OR STATION INDICATOR.
APPLICATION FILED JULY 29, 1903. RENEWED MAR. 2, 1906.

No. 851,215. PATENTED APR. 23, 1907.
H. E. BEACH & C. E. GIERDING.
B. B. BEACH, ADMINISTRATOR OF H. E. BEACH, DEC'D.
STREET OR STATION INDICATOR.
APPLICATION FILED JULY 29, 1903. RENEWED MAR. 2, 1906.

No. 851,215. PATENTED APR. 23, 1907.
H. E. BEACH & C. E. GIERDING.
B. B. BEACH, ADMINISTRATOR OF H. E. BEACH, DEC'D.
STREET OR STATION INDICATOR.
APPLICATION FILED JULY 29, 1903. RENEWED MAR. 2, 1906.

WITNESSES:
INVENTORS:
BY
ATTORNEY

UNITED STATES PATENT OFFICE.

HARRY E. BEACH AND CHARLES E. GIERDING, OF NEWARK, NEW JERSEY; SAID GIERDING ASSIGNOR TO SAID BEACH; BENJAMIN B. BEACH ADMINISTRATOR OF SAID HARRY E. BEACH, DECEASED.

STREET OR STATION INDICATOR.

No. 851,215.　　　　　Specification of Letters Patent.　　　　Patented April 23, 1907.

Application filed July 29, 1903. Renewed March 2, 1906. Serial No. 303,796.

*To all whom it may concern:*

Be it known that we, HARRY E. BEACH and CHARLES E. GIERDING, citizens of the United States, residing at Newark, in the county of Essex and State of New Jersey, have invented certain new and useful Improvements in Street or Station Indicators; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference to improvements in station or street indicators for railway cars, and this invention is in the nature of improvements in station or street indicators of the character set forth in an application for Letters-Patent filed by Harry E. Beach, on the 30th. day of April, 1903, Serial Number 154,948.

The principal object of the present invention is to simplify the general arrangement and construction of the various parts of mechanism with a view of providing a perfect and correctly operating mechanism, and a device in which the tension, which often causes the distortion and improper workings of the flexible indicating tape, is entirely removed from the tape, the various feed-rolls and the cylinder over which the tape passes, in either direction, depending for their motion upon positively acting mechanical means and not upon the frictional contact between the indicating tape and two or more cylinders.

A further object of this invention is to provide such various arrangements and combinations of mechanism whereby a more positively acting indicating apparatus may be provided, comprising a pair of main shafts only one of which carries a feeding cylinder or drum, said main shaft being provided with intermeshing gears, also two sets of independently operating actuating devices or mechanism for rotating the cylinder in either direction, as desired, and thereby feeding the indicating tape past a pair of oppositely located windows in the case or box of the apparatus, to expose from said windows at the same time the same name of a street or sta- tion, the arrangement and construction of the parts being such that the one set of actuating mechanism is automatically rendered inoperative while the other set of actuating mechanism is in operative use, and vice versa.

Other objects of this invention not at this time more particularly specified will be clearly evident from the following detailed description of our invention.

The present invention therefore consists in the novel station or street indicator hereinafter set forth; and, furthermore, this invention consists in the various arrangements and combinations of the devices and their parts, as well as in the details of the construction of the same, all of which will be described in detail in the accompanying drawings, and then finally embodied in the clauses of the claim.

Our invention is clearly illustrated in the accompanying drawings, in which:—

Fig. 3 is a similar section, taken on the same line, but representing the mechanism and parts, in side elevation, in their actuated positions, when one of the operating or pull-cords has been pulled, the box or case, however, having been omitted from this view. Fig. 6 is a transverse vertical section, taken on line 6—6 in said Fig. 1, looking in the direction of the arrow $z$ in said figure.

Similar characters of reference are employed in all of the said above described views, to indicate corresponding parts.

Figure 1:
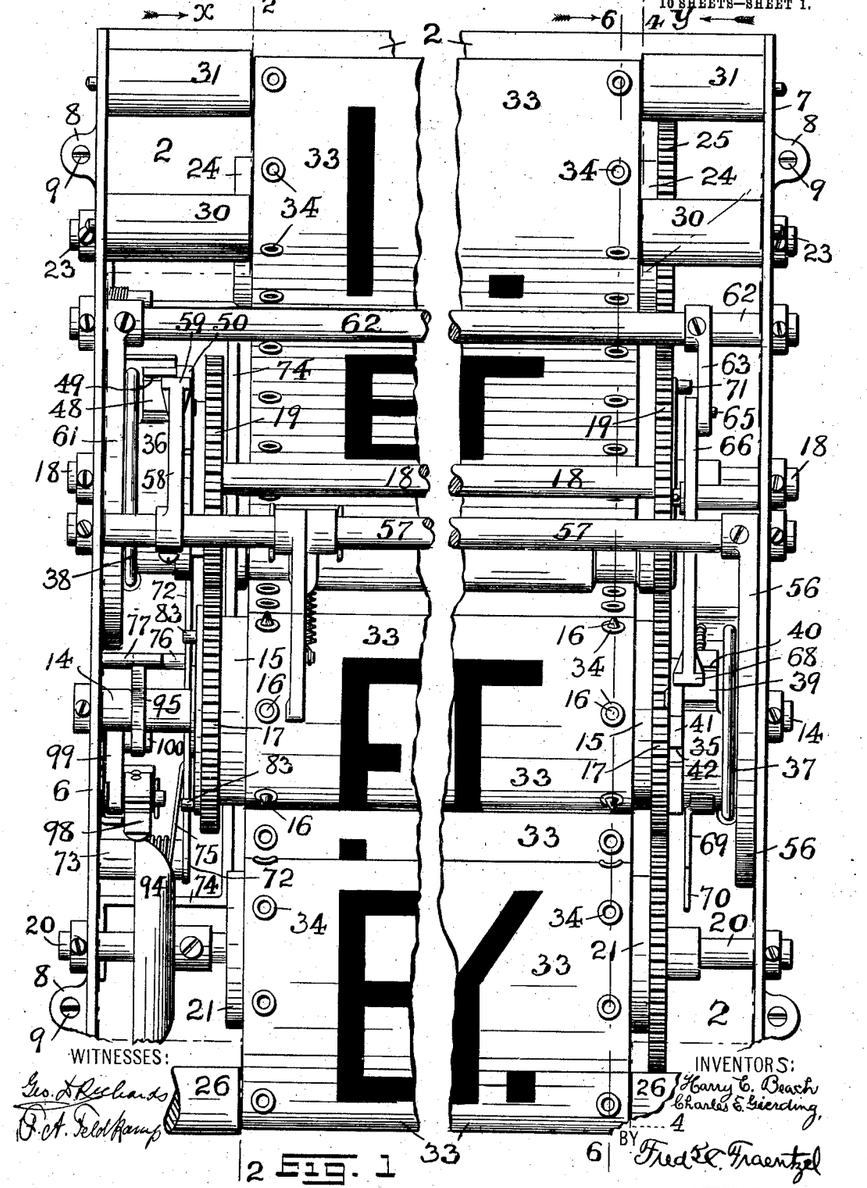
Figure 1 is a top or plan view of the devices and mechanism comprising the station or street indicator embodying the principles of this invention, the box or case in which the mechanism is arranged having been omitted from this view.
Figure 2:
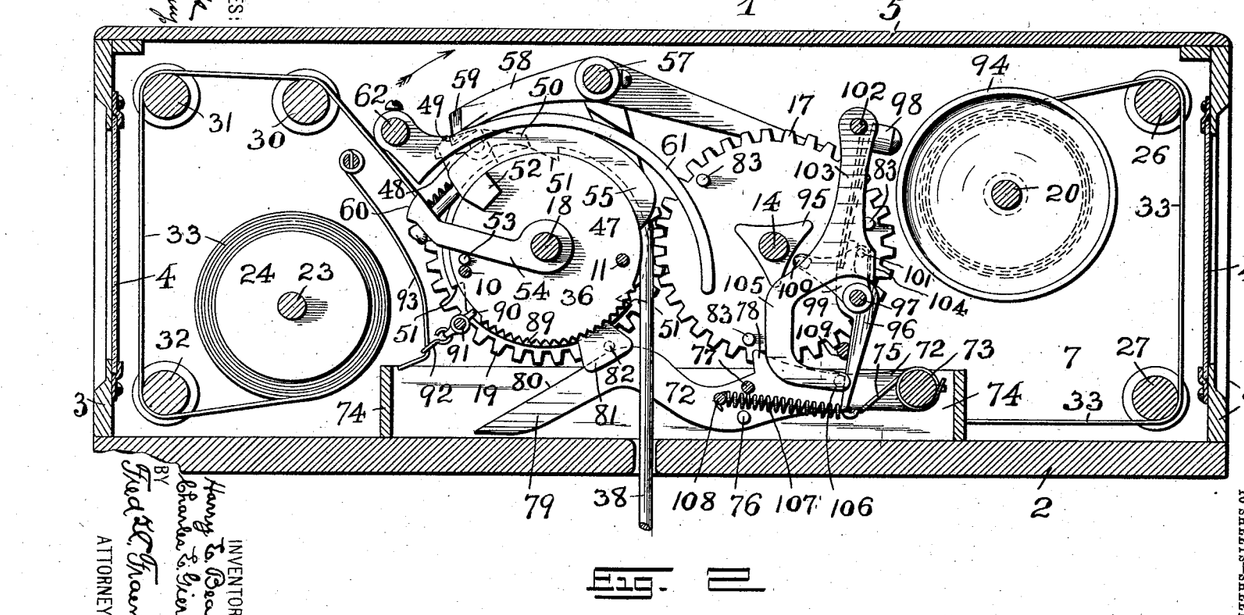
Fig. 2 is a transverse vertical section of the apparatus, with the box or case shown, the said section being taken on line 2—2 in said Fig. 1, looking in the direction of the arrow $x$, representing the mechanism and parts, in side elevation, in their normally inoperative positions.

Referring now to the said drawings, it will be noticed that the apparatus is provided with two sets of actuating mechanisms for feeding or moving the indicating tape in opposite directions, according to the direction of travel of the car, when going in what is known as the "in" or the "out" or in the "up" or "down" directions, the mechanism on the one side being locked or held automatically against turning in the wrong direction, when the mechanism on the other side is being actuated by the pulling of a strap or cord, during the "out" or "down" trip; and, vice versa, during the "in" or "up" trip, the previously locked mechanism being actuated by the pulling of another strap or cord, whereby the previously operated mechanism Referring now to Fig. 2 of the drawings, it will be seen, that the tape-feeding mechanism may be enclosed in a suitable box or case 1, made of wood or metal, and comprising a base 2, the ends 3 having windows 4, the usual sides, not shown in the drawings, and a cover or top 5. Suitably secured within said box or case 1, in close proximity to the opposite sides of the box or case, are a pair of brackets or frames 6 and 7 provided with variously disposed bearings in which the journals of the variously placed shafts and rollers hereinafter mentioned rotate. These brackets or frames are secured upon the base 2, in any suitable manner, and preferably by means of the lugs 8 and screws 9, as represented in Fig. 1 of the drawings; but they may be otherwise secured thereto, and, if desired, the said frames 6 and 7 may form the opposite sides of the box or case 1 in which the mechanism is arranged.

Figure 4:
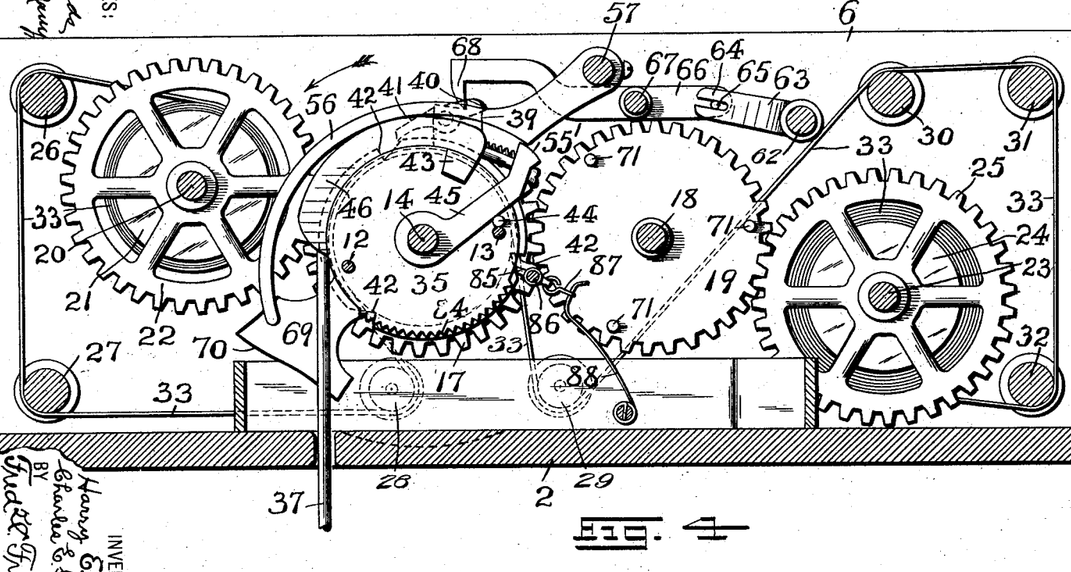
Fig. 4 is a transverse vertical section, with the box or case omitted, of the mechanism and parts, the said section being taken on line 4—4 in said Fig. 1, looking in the direction of the arrow $y$, illustrating the mechanism and their parts, in side elevation, in their normally inoperative positions.
Figure 5:
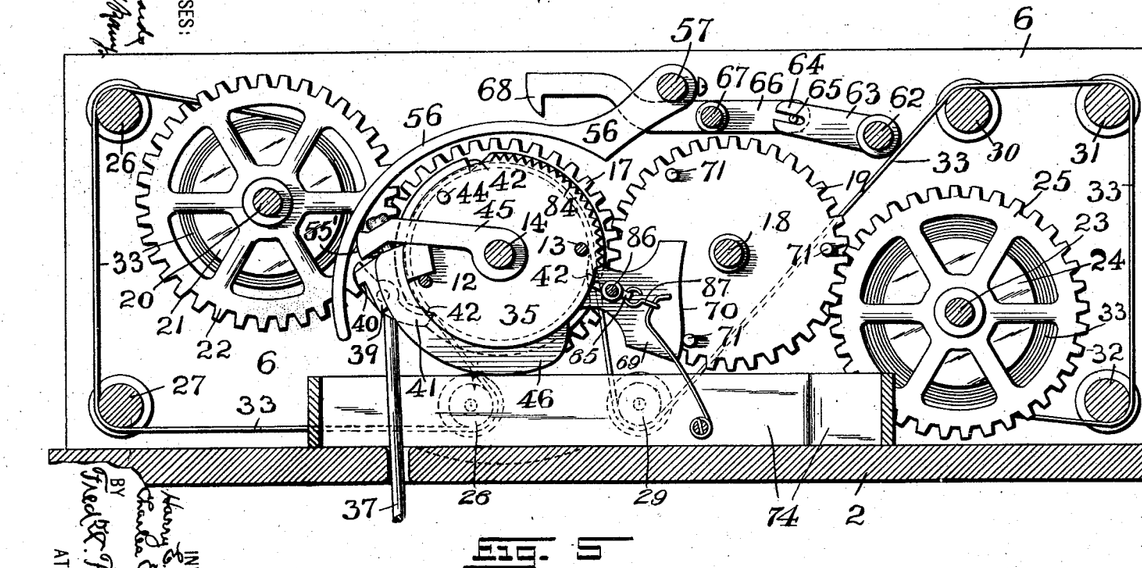
Fig. 5 is a similar section, taken on the same line, but representing the mechanism and parts in their actuated positions, when another operating or pull-cord has been pulled.
Figure 7:
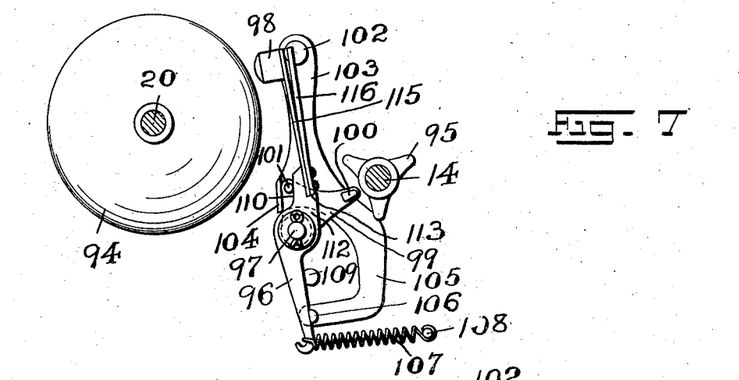
Figs. 7, 8 and 9 are detail face views of a gong and striking mechanism, Fig. 7 representing the parts of the striking mechanism in their normal initial positions, Fig. 8 representing the parts of the striking device in one of their actuated positions, when the indicating tape has been moved in the direction of the arrow $u$ in Fig. 3, and the said Fig. 9 representing the parts of the striking device in another actuated position, when the indicating tape is moving in the direction of the arrow $v$ in said Fig. 3 of the drawings.
Figure 15:
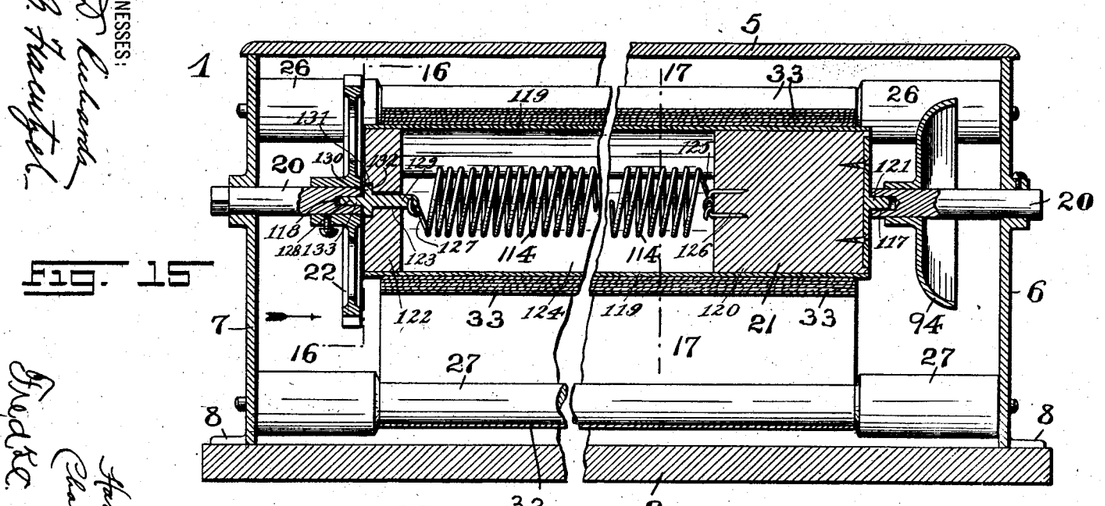
Fig. 15 is a transverse vertical section through the casing of the indicator and one of its spring-rollers upon which the tape is rolled or from which it may be delivered.

Referring now to Figs. 2 and 3, the frame or bracket or plate 6 is provided with a pair of suitably disposed stops or projections 10 and 11 which extend in directions toward the opposite frame or plate 7; and, from an inspection of Figs. 4 and 5 it will be seen that the frame or plate 7 is provided with a pair of suitably disposed stops or projections 12 and 13 which extend in directions toward the opposite frame or plate 6. In suitable bearings in the frames or plates 6 and 7 is a shaft or spindle 14 on which is a cylinder or drum 15, the said cylinder or drum being made of any suitable material, and having on its cylindrical surface at or near both of its marginal edges suitably disposed and suitably constructed sprockets or projections 16. At both ends of the said cylinder or drum 15 are gear-wheels 17 which may be a part of the said cylinder or drum or may be independent therefrom, in which case said gear-wheels are suitably secured to the said shaft or spindle 14. In another set of bearings in the said frames or plates 6 and 7 is a second shaft or spindle 18 also provided with a pair of toothed or gear-wheels 19 in mesh with the respective gear wheels 17. Suitably arranged between a pair of short spindles 20, as indicated in Fig. 15, is a spring roller 21, and 22 indicates a gear wheel connected with said roller and in mesh with one of the gear wheels 17 of the cylinder 15 or shaft 14; and suitably arranged between the short spindles 23 is a spring roller 24 and a gear wheel 25 which is connected with the roller gagement with the said sprockets or projections 16 of the cylinder or drum 15, as clearly illustrated in Figs. 1 and 6. This indicating tape or band has its one end suitably secured to the spring-roller 21, being wrapped around the roller as shown, and it is then passed over the rollers 26, 27 and 28, around a portion of the cylinder or drum 15, with the eyelets 34 in operative engagement with a portion of the sprockets or projections 16, the tape or band then passing over the rollers 29, 30, 31 and 32, and about the spring-roller 24, the opposite end of the said tape or band being suitably secured to the said spring-roller 24.

Loosely mounted upon the spindle or shaft 14, between the inner surface of the frame or plate 7 and the gear 17, is a suitable actuating spring device 35, by means of which the cylinder or drum is made to receive an intermittent rotary motion in the one direction, the various spring-rollers, through the intermediate gears being rotated in such a manner that the indicating tape or band 33 is unreeled from the roller 24 and reeled upon the roller 21, the drum or cylinder 15 in this instance acting as the prime mover for feeding the indicating tape in the direction of the arrow $u$ in Fig. 3, past the two windows 4 of the box or case 1, as will be clearly understood. In a like manner, there is loosely mounted upon the shaft or spindle 18, between the inner face of the plate or frame 6 and the gear wheel 19 a second actuating spring device 36, by means of which the shaft or spindle 18 and its gears 19 are made to receive a rotary motion in an opposite direction from that above described. This motion is imparted through the other gear wheels to the cylinder 15, and the spring rollers 24 and 21, the tape being unreeled from the roller 21 and reeled upon the roller 24, the drum or cylinder 15 in this case also acting as the prime mover for feeding the indicating tape in the direction of the arrow $v$ in said Fig. 3 past the two windows 4 of the box or case 1. The successful operation of properly feeding the indicating tape at all times is an important one, and is due to this arrangement of the geared spring-rollers 21 and 24. For sake of illustration, we will call the roller 21 the spring-take-up roller and the roller 24 the spring-delivery roller. Primarily both of said rollers receive their rotary motions from their gears 22 and 25 in mesh, respectively, with the gears 17 and 19, the purpose of the springs in the said take-up and delivery rollers being simply to take up any slack of the indicating tape occasioned by the varying diameters of the two spring-rollers, as they alternately become take-up and delivery rollers, in accordance with the direction of travel of the indicating tape 33. We have found in practice that by simply using two spring-rollers, without the gearing, that such rollers are altogether insufficient to perform the work required of them; namely:—to deliver to and take from the feed roller a given length of the tape at each operation of the machine and maintain a comparatively even tension of the springs in the rollers, so that the tape will be drawn taut in both directions from the feed roller and toward each of the other rollers. By this arrangement of the geared spring rollers the tape is balanced, as it were, throughout its entire length of its travel, and it is obvious that the strain upon the tape, the eyelets 34 and the sprockets 15 is only such as is incident to the imparting of motion to the tape by means of the actuating devices of the apparatus. We have found, that with non-geared spring-take-up and delivery-rollers, depending solely upon the action of the springs within the rollers, that an even tension of the tape could not be maintained. This is for the reason that as soon as the delivery roll had delivered about three-quarters of the tape required, the spring in this roller became wound up so tight, and the spring in the take-up roller became so slack or loose, that the two rollers were badly out of balance with relation to each other and to the main feed roller 15, so much so in fact that the tension of the spring in the delivery-roller would pull the eyelets from the indicating tape, notwithstanding the fact that they were well put in position. It also is a fact, that the uneven tension of the two rollers would cause the tape to jump off the sprockets in the direction of the delivery roller because of the great strain exerted by it. Thus, in an apparatus provided with the geared spring-rollers according to our present invention, an indicating tape of very great length can be used, the tape being always evenly balanced throughout its entire length of forward and backward travel, the gearing properly feeding the tape from and upon the respective rollers 21 and 24, while the springs of said rollers simply maintain an even tension and prevent any slack of the tape. Thus it will be evident, that the cylinder or drum 15 can be rotated in opposite directions according to the actuation of the actuating devices 35 and 36 by the pulling of the cord 37 or cord 38, the other parts of the mechanism receiving corresponding movements, and at any time the indicating tape may be moved past the windows in either direction.

The features relating to either of the spring-take up or delivery rollers will be clearly understood from an inspection more particularly of Fig. 15 of the drawings, from which it will be evident, that the tension of the coils of the spring 114, arranged between the body of the roller 21 and the driving gear 22, (or in like manner between the body of the roller 24 and its driving gear 25,) will act somewhat independently in addition to the rotary movements of the roller produced by the gear, the springs in the said rollers 21 and 24 compensating for the varying diameters of said rollers, as the indicating tape is moved in its backward and forward directions.

We will now describe the general arrangement and operation of the actuating device 35 on the shaft or spindle 14 and the mechanism for locking the actuating device 36 on the shaft 18 against turning. This actuating device 35 comprises a spring-controlled cylinder or drum which is loosely mounted upon the shaft 14; and, as will be seen from Figs. 1, 4 and 5, is made with a projection or extension 39 having an off-set 40, and pivotally connected with said projection or extension 39 is a pawl or dog 41, normally resting in a position directly in front of one of three notches 42 at the side of one of the gear-wheels 17, as clearly indicated in dotted outline in said Figs. 4 and 5. The said cylinder or drum is also made with the lugs or projections 43 and 44, the lug 44 normally resting against the lug or projection 13 on the frame or plate 7 to limit the return movement of said cylinder or drum after it has been operated by the movement of an arm 45, as will presently appear, and returns to its initial position. The said arm or lever 45 is pivotally arranged upon the shaft 14 and is actuated by means of the pull-cord 37 which has its end attached to said arm or lever 45 and passes over a portion of the cylinder or drum at the side of a guide-flange 46 which prevents the displacement of the cord upon any sudden return-movement of the said cylinder or drum. The forward movement of the cylinder or drum is caused by the engagement of the said arm or lever 45 with the lug 43 until the stop or projection 12 is reached, as indicated in Fig. 5, the pawl or dog 41 sliding in engagement with one of the notches 42, thereby producing a partial rotation of the gears 17 and the shaft 14, and in consequence thereof also producing an intermittent movement of the indicating tape 33 in the direction of the arrow $u$ in said Fig. 3.

Figures 18, 19:
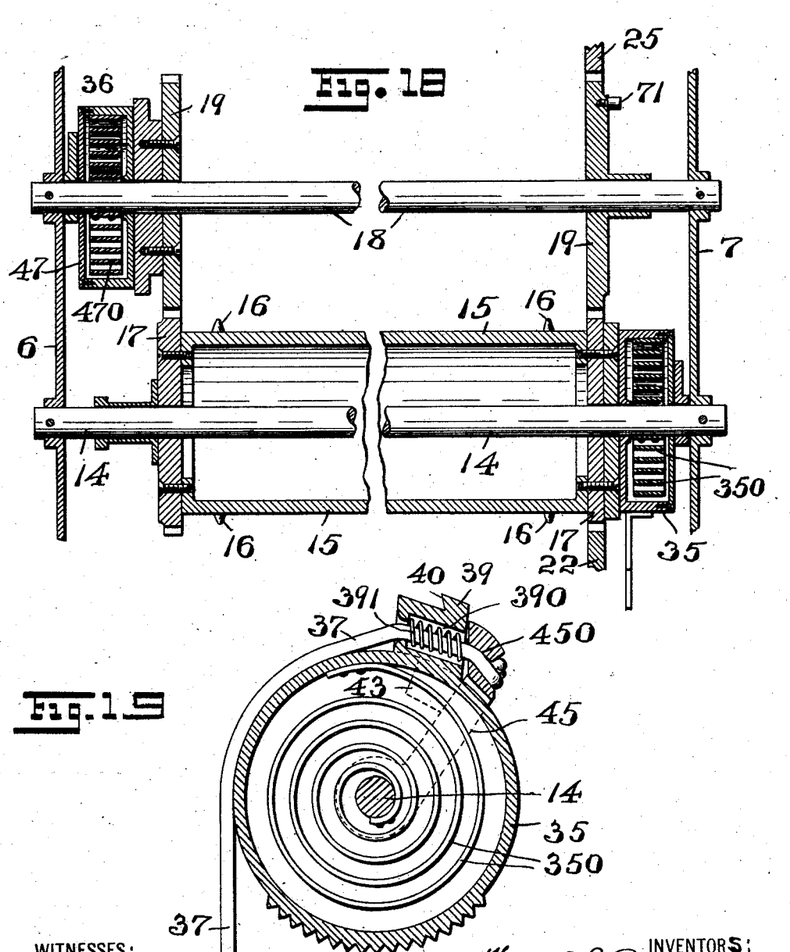
Fig. 18 is a detail view, partly in plan and horizontal section of the two operating shafts, the main drum upon one of said shafts, the actuating gears between said shafts, and a spring device upon each shaft.
Fig. 19 is a transverse section, on an enlarged scale, of one of said spring-devices and the shaft upon which it is arranged.

Just prior to operatively connecting the above described actuating mechanism or device with the shaft 14 for the proper rotary motion of the tape-feeding cylinder or drum, in the manner stated, it will be necessary that the other actuating mechanism or device upon the shaft or spindle 18 should be locked or held in its inoperative position against turning upon the said shaft 18, and it is for this reason that the arm 45 has the cord 37 directly attached to it, that said arm may be moved from its position in contact with the lug 44 before moving the device 35 until the arm is brought in engagement with the lug or extension 43, as will be presently described. The said actuating device is made in the form of a hollow or chambered drum or cylinder which is loosely mounted upon the shaft or spindle 14 and has connected therewith a spiral spring 350 which has its one end secured to said shaft and its other end fastened to said drum or cylinder, substantially as shown in Fig. 19. The previously mentioned cord or strap 37 passes through a duct 390 in the extension 39, being inserted in an opening 450 in the end-portion of the lever 45 and suitably secured therein, substantially as illustrated. That the said lever may not be forcibly brought in contact with the projection 39, when too great a pull is exerted upon the cord or strap, a coiled spring 391 is arranged in said duct 390, said spring encircling that portion of the cord within the duct, and being in contact with a part of the lever 45 readily takes up the force exerted by the sudden contact, as will be clearly evident. When the pulling power is removed from the cord or strap, the spring 350 will return the spring-device without affecting the position of the shaft or spindle 14, so as to be ready for the next operative movements of the parts, when the cord or strap 37 is again pulled.

The other actuating device 36 is similar in its general construction to that of the actuating device 35, and the same comprises a spring-controlled cylinder or drum 47 loosely mounted upon the shaft or spindle 18, as will be seen from Figs. 1, 2 and 3, and which is provided with a spiral spring 470, see Fig. 18, acting in the manner of the spring 350 which is connected with the other spring-device 35. The same is made with a projection or extension 48 having an off-set 49, and pivotally connected with said projection or extension 48 is a dog or pawl 50 which normally rests in a position directly in front of one of three notches 51 at the side of one of the gear-wheels 19, as represented in dotted outline in said Figs. 2 and 3. The said cylinder or drum 47 is also made with the lugs or projections 52 and 53, the lug 53 normally resting against the lug or projection 10 of the frame or plate 6 to limit the return movement of said spring-controlled cylinder or drum after it has been operated by the movement of the arm 54, and returns to its initial position. The said arm 54 is pivotally arranged upon the shaft 18 and is actuated by means of the pull-cord 38 which has its end cushioned in the manner of the cord 37, as shown in Fig. 19, said end of the cord 38 being attached to said arm 54 and passing over a portion of the cylinder or drum at the side of a guide-flange 55 which prevents the displacement of the cord upon the sudden return movement of the said drum or cylinder. The forward movement of the said drum or cylinder is caused by the engagement of said arm or lever 54 with the lug 52 until the stop or projection 11 is reached, as indicated in Fig. 3, the pawl or dog 50 being brought in engagement with one of the notches 51 thereby producing a partial rotation of the gears 19 upon the shaft 18, and in consequence thereof an intermittent movement of the indicating tape 33 in the opposite direction from that above stated, or in the direction of the arrow $v$ in said Fig. 3. However, prior to operatively connecting the above described actuating device or mechanism with the shaft 18 for the proper motion of the tape-feeding cylinder or drum, in the manner stated, it will be necessary that the other and previously described actuating device or mechanism on the shaft 14 may be locked or held in its inoperative position against turning upon the said shaft 14, and it is for this reason that the arm 54 has the cord 38 directly attached to it, that the said arm may be moved from its position in contact with the lug 53 before moving the device 36 until the arm 54 is brought in engagement with the lug or projection 52, as will be presently more particularly set forth.

Now, returning to Figs. 4 and 5 of the drawings, we will describe the mechanism for retaining the actuating device which is arranged upon the shaft or spindle 18 in its inactive position, while the actuating mechanism or device upon the shaft or spindle 14 is active. Thus, when the cord 37 is pulled, the arm or lever 45 moves in the direction indicated by the arrow in Fig. 4, and its end 55' is brought in slidable lifting contact with the under curved and cam-shaped edge of a segmental arm 56, before coming in contact with the lug 43 of the actuating device 35. This arm 56 is attached to a shaft or spindle 57 which oscillates in suitable bearings in the side frames or plates 6 and 7. The oscillatory movement of this shaft or spindle 57 actuates an arm 58, see Fig. 2, which is secured to said shaft 57, and the downward movement of said arm 58, (produced by the movement of the shaft 57,) in engaging with the pawl or dog 50 lifts the latter out of the way of engagement with the notch 51 at the side of the gear 19 upon the shaft 18, thereby permitting said gear to turn with the gear 17 on the shaft 14. At the same time, the end 59 of the arm 58 is brought in holding engagement with the off-set 49 of the projection 48 on the cylinder or drum 47, whereby the latter is held against turning. By this time, the arm or lever 45 has engaged the lug 43 on the other drum or cylinder 35, and produces the rotary movement of the respective gears, and the cylinder or drum 15, to feed the indicating tape. The parts are held in these relative positions until the cord 37 has been released, and the actuating mechanism indicated in Fig. 5 returns to its normal initial position represented in Fig. 4. In like manner, when the cord 38 is pulled, the arm or lever 54 moves in the direction of the arrow in Fig. 2, its end 60 being brought in slidable lifting engagement with the under curved and cam-shaped edge of a segmental arm 61 which is secured upon a shaft or spindle 62 oscillating in suitable bearings in the side-frames or plates 6 and 7, previous to the engagement of the arm or lever 54 with the lug 52 of the cylinder or drum 47 of the device 36. Thus, when the said shaft or spindle 62 is actuated by the lifting of the segmental arm 61, an arm 63 which is secured to said shaft or spindle 62 and has a forked or slotted end 64 in lifting engagement with a pin or projection 65 on an arm 66 fulcrumed on a shaft or bar 67, causes the opposite and hook-shaped end-portion 68 of said arm 66 to be lowered upon the pawl or dog 41 and raises the said pawl or dog out of the way of engagement with the notch 42 at the side of the gear 17. The said gear 17 is thus free to turn with the gear 19; and, at the same time, the said hook-shaped end-portion 68 of the arm 66 is brought into holding engagement with the off-set 40 of the projection or extension 39 of the actuating device 35. The cylinder or drum of said device 35 is thereby held against turning, while the arm or lever 54 which by this time has moved against the lug 52 on the cylinder or drum of the actuating device 36 provides the rotary motion of the said cylinder or drum of the device 36 and of the gears and cylinder 15, to feed the indicating tape in the opposite direction from that previously specified. The various parts are held in these relative positions until the cord 38 is released and the actuating mechanism indicated in Fig. 3 returns to its initial position represented in Fig. 2 of the drawings.

Having thus described the general construction of the various mechanisms and their action for intermittently moving the indicating tape 33 in either of the directions represented by the arrows $u$ and $v$, and the manner of rendering the actuating device connected with the one shaft inoperative, while the actuating device connected with the other shaft is operative, and vice versa, we will now set forth a means for causing a positive stop of the mechanism and the indicating tape when the guard or conductor has pulled either cord. For sake of illustration these stops may be called "momentum" stops, and they are for the purpose of preventing the cylinder or drum 15 rotating farther than desired, and also to prevent any buckling or slip of the indicating tape that might be produced by the momentum of the rotary parts, provided such momentum stop-mechanism were not present.

The momentum stop-mechanism connected with the actuating device represented in said Figs. 4 and 5 is in the form of a projection or extension 69 which extends from the cylindrical edge of the drum or cylinder of the actuating device, and has an edge 70 which, at the proper time, and in the present case at the end of each one-third revolution of the parts, has its edge 70 brought in the position indicated in Fig. 5 of the drawings, whereby one of the three projections or pins 71 on the side of one of the gears 19 on the shaft 18 is brought against said edge 70, and thereby limiting and positively stopping all further movement of the parts, until the cord 37 has been released and the parts again return to their normal initial positions, indicated in Fig. 4 of the drawings.

The momentum stop-mechanism which is employed with the actuating cylinder or drum 47, as will be seen from an inspection of Fig. 2 of the drawings, comprises a peculiarly shaped arm 72 which is connected with a stud or rod 73 and oscillates upon the same between the inner face of the plate or frame 6 and a suitable frame or support 74, the upward movement of said arm 72 being produced by a suitable spring 75 and being limited in such movement by engagement of a stop 76 on said arm with a projection or pin 77 outside of said arm. The said arm 72 is also made with a projection 78 forming an off-set and has a peculiarly formed end-portion 79 having its upper edge 80 normally in engagement with a pin or projection 82 on an extension 81 of the cylinder or drum 47, as clearly illustrated in Fig. 2.

As soon as the actuating cylinder or drum 47 is actuated by a pull upon the cord 38 the pin or projection 82 moves away from its engagement with the edge 80 of the arm 72, one of three pins or stops 83 on the side of the gear 17 also moving away from its initial position directly above the projection 78. As soon as the pin or projection 82 has moved clear of the edge 80 of the arm 72, the spring 75 causes said arm 72 to be brought in its raised position indicated in Fig. 3, bringing the off-set of the projection 78 directly in the path of the next pin or stop 83 of the gear 17, and thereby positively stopping all further movements of the parts until the cord 38 has been released and the parts return again to their normal initial positions indicated in said Fig. 2 of the drawings.

Figures 10, 11, 12, 13, 14:
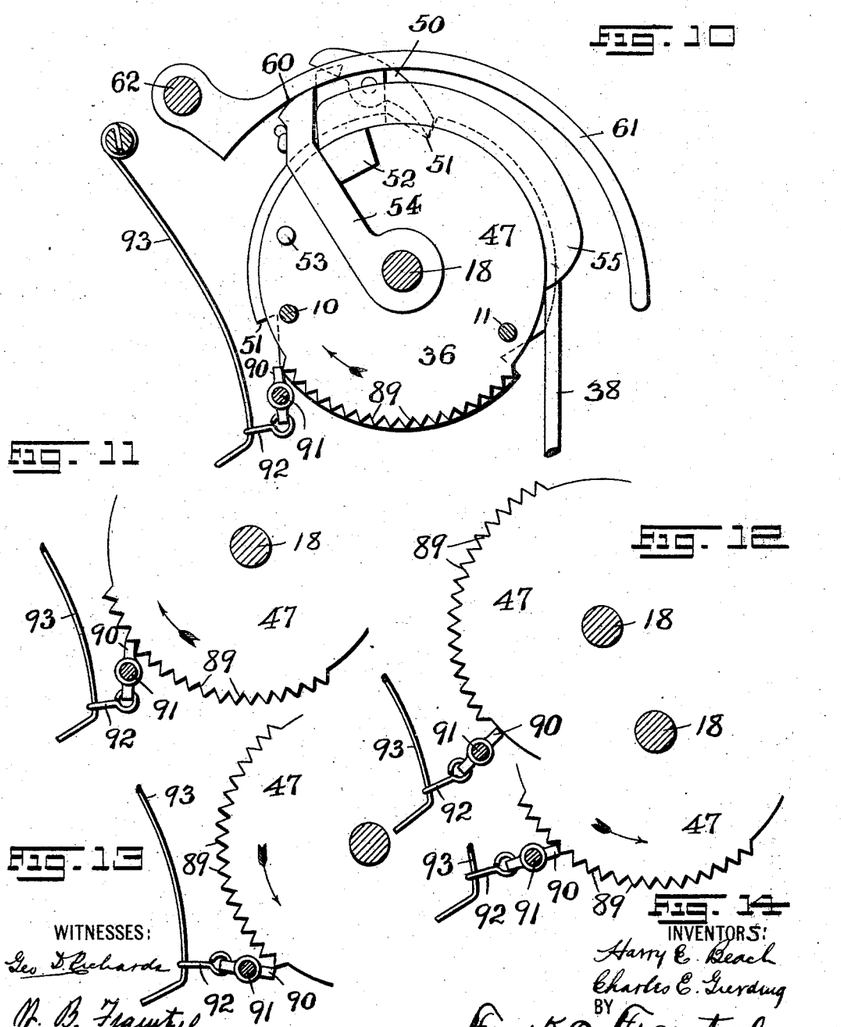
Figs. 10, 11, 12, 13 and 14 are side views of parts of one of the actuating devices and a holding device or safety dog during a complete movement of the actuating mechanism, during a partial or incomplete movement of the same, and during the return movements of said mechanism.

To cause a complete movement of the indicating mechanism at each pull of the cord 37, the drum or cylinder of the actuating device 35 is provided along a portion of its cylindrical surface with serrations or V-shaped teeth 84 with which a holding device 85 which is pivotally arranged upon a rod or pin 86 is brought in sliding engagement, when the cord 37 is strongly pulled; but, which retains the drum against any backward or return movement should the cord 37 be lightly and improperly pulled, the parts being held in such relation by a link 87 and a spring 88. A full or complete pull of the cord 37 will thus be required to fully actuate the mechanism in order that the drum or cylinder of the device 35 may, after it has made its complete movement, be automatically returned to its initial position, before the mechanism can be again operated to indicate the next street or station. In a like manner the actuating cylinder or drum 47 of the actuating device 36 is made upon a portion of its cylindrical surface with serrations or V-shaped teeth 89 with which a holding device 90 which is pivoted on a rod or pin 91 is brought in holding engagement should the movement of the cylinder or drum 47 cease when said serrations or teeth 89 are opposite the device 90, the latter being retained in such holding relation by a link 92 and spring 93, as clearly illustrated in Fig. 2 and for the purpose above stated. The pivotal arrangement of the devices 85 and 91 is such that they will pass over the serrations or V-shaped teeth 84 and 89 without interfering with the rotary movements of the actuating cylinders or drums when the cords 37 and 38 are properly pulled and the mechanism of the street or station indicating apparatus has fully indicated the name of the street or station. The operation of one of these holding devices or safety dogs is clearly illustrated in Figs. 10 to 14 inclusive. In Fig. 10 is shown the position of the holding device or safety dog 90, just as the mechanism is being actuated by the pull cord 38; Fig. 11 illustrating the position of the holding device or safety dog 90 at the partial pull of the cord to prevent the drum from revolving backward at such time. In Fig. 12, we have indicated the position of the said holding device or safety dog 90 at the time of the complete pull upon the cord, and in Figs. 13 and 14 are represented two of the positions of the holding device or safety dog 90 during the backward or return movement of the cylinder or drum after the cord 38 has been released.

A gong 94 may be employed with the device, the gong being sounded by the striking mechanism illustrated more particularly in Figs. 2, 3, 7, 8 and 9, every time that the indicating tape has been moved one space to expose to view the name of a street or station at the opposite windows of the apparatus. This gong is preferably arranged upon the spring-roller shaft or spindle 20, as illustrated in Figs. 1, 2 and 3. Upon the main shaft or spindle 14 is a trip-device 95 of a triangular shape. The gong-striking-mechanism consists, essentially, of an arm 96 which is pivoted upon a pin 97 extending from the side of the frame 6. The said arm 96 is provided with an upwardly extending portion 112 having an off-set 113 upon which is secured by means of screws or rivets an arm 115 provided with a striker 98. Arranged directly against the back of said arm 115 is a vibrator 116 which is secured in place by means of the same screws or rivets, substantially as illustrated in said Figs. 7, 8 and 9. Rotatively arranged upon said pin 97 and at the side of said arm 96 is a trip 99 having a pair of extensions or projections 100 and 101, as shown. Pivotally arranged upon another pin 102 is an arm or lever 103 having a laterally extending flange or shoulder 104 and a peculiarly bent lower part or member 105 which is provided with a projection 106 against which the said arm 96 rests, due to the action of a spring 107 which is attached to the lower end of said arm 96 and a pin 108 extending from the side of the frame 6. A stop or projection 109 extending into the space formed between the arm 96 and the member 105 of the arm or lever 103 limits the swinging movements of these parts when operated.

Figures 8, 9:
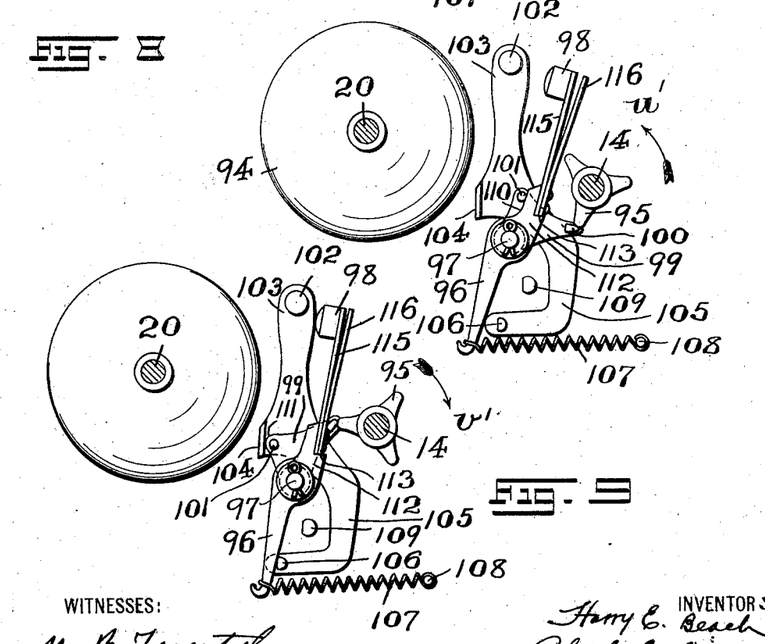

Now, when the trip 95 is caused to rotate in the direction of the arrow $u'$, then the trip 95 is brought in sliding engagement with the projection 100 of the device 99 and its other projection 101 being in engagement with the edge-portion 110 of the arm 96 the latter is caused to assume the position indicated in Fig. 8, and thereby distends the coils of the spring 107. As soon as the trip-device 95 has passed beyond the projection 100, the said spring 107 causes the parts to suddenly assume their normal initial positions indicated in Fig. 7, but not before the striker 98 has been forced in contact with the gong and thereby sounds the same. When, however, the trip-device 95 is caused to rotate in the direction of the arrow $v'$, see Fig. 9, then the lifting engagement of the tripper 95 with the projection 100 of the device 99 brings the edge 111 of said device 99 in forcible sliding engagement with the flange or shoulder 104 of the arm 103. This action causes the lower curved portion 105 of the lever 103 to swing in a direction toward the gong, and the arm 96 being in contact with the projection 106 on said curved portion or member 105, the coils of the spring 107 are again distended, as illustrated in said Fig. 9. As soon as the trip-device 95 has passed beyond the projection 100, the spring 107 again causes the parts to suddenly assume their normal initial positions indicated in Fig. 7, the striker 98 having been brought in sounding contact with the gong, just before the parts remain at rest. It will thus be evident that no matter in which direction the indicating tape is moved, at the end of each intermittent motion of the tape, the gong will be sounded to attract the attention of the passengers to the indicating device.

Figure 16:
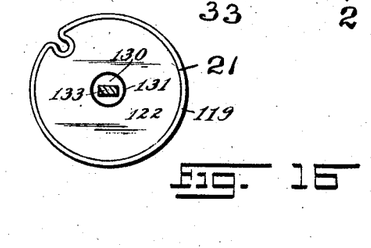
Fig. 16 is a vertical cross-section, taken on line 16—16 in said Fig. 15, when looking in the direction of the arrow, with the tape-roller represented in end elevation.
Figure 17:
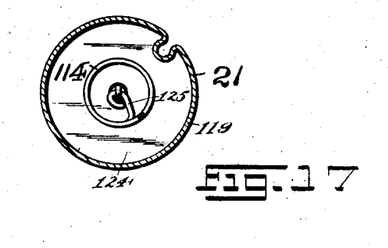
Fig. 17 is a vertical cross section taken on line 17—17 in said Fig. 15, the tape in each of said views having been omitted.

Having thus set forth the general operations of the machine or apparatus, we will now describe in detail one arrangement of the means for successfully actuating either of the said spring-rollers 21 or 24. In this connection we will describe the construction of but one of the said rollers, as 21, as indicated in said Figs. 15, 16 and 17. Referring now to said Fig. 15, it will be seen that the short spindle 20 at the right of the said figure is made with a cylindrical receiving socket or bearing 117, while the other short spindle portion 20 at the left of the said figure is made with a receiving socket 118 of a rect-angular cross-section. The roller itself is preferably a cylindrical shell 119 having secured in its one end a solid end-portion or member 120 provided with a stud or lug 121 which is rotatably arranged in the said socket or bearing 117, and suitably secured in the opposite end of the said shell 119 is an end-portion of member 122 which is provided with a receiving portion 123, as clearly shown. In this manner, the roller is provided with a chamber 124 in which is arranged the previously mentioned compensating spring 114. This spring, as will be seen from the drawings, has its one end-portion 125 secured directly to the said solid end-member 120 by means of any suitable fastening means, as 126, while its opposite end-portion 127 is attached to the end-portion 129 of a plug 128 loosely arranged in the receiving portion 123 of the end-member 122. That the said plug 128 may be operatively retained in the said receiving portion 123, the said plug 128 is made with an annular shoulder 130 which fits in an enlarged open part 131, as clearly illustrated in said Fig. 15, and bears directly against the surface 132 of said part 131. The opposite end-portion 133 of the said plug 128, as will be seen from an inspection of Fig. 16, is of an angular cross-section and is operatively fitted in the correspondingly formed receiving socket 118. It will thus be seen, that when the gear 22 is actuated, it rotates the plug 128, and by the compensating spring 114 produces the rotary motion of the roller 21, in the manner and for the purposes previously set forth.

We are aware, that various changes may be made in the arrangements and combinations of the devices and their parts, as well as in the details of the construction thereof, without departing from the scope of the present invention, as defined in the appended claims. Hence we do not limit our invention to the exact arrangements and combinations of the devices and the parts thereof, as described in the foregoing specification and as illustrated in the accompanying drawings, nor do we confine ourselves to the exact details of the construction of any of the said parts.

Having thus described our invention, what we claim is:—

1. In a street or station indicator, a pair of main shafts, a feeding cylinder on one of said shafts, gear wheels on said shafts and in operative engagement with each other, an indicating tape arranged over the said feeding cylinder, and an actuating mechanism connected with each shaft acting separately and independently from each other to rotate the feeding cylinder in opposite directions, and a momentum stop-mechanism adapted to be actuated from each main shaft, substantially as and for the purposes set forth.

2. In a street or station indicator, a pair of main shafts, a feeding cylinder on one of said shafts, gear wheels on said shafts and in operative engagement with each other, sprockets on said cylinder, an indicating tape arranged over the said feeding cylinder, eyelets in said tape registering with the sprockets of said cylinder, and an actuating mechanism connected with each shaft acting separately and independently from each other to rotate the feeding cylinder in opposite directions, and a momentum stop-mechanism adapted to be actuated from each main shaft, substantially as and for the purposes set forth.

3. In a street or station indicator, the combination, of a pair of main shafts 14 and 18 a feeding cylinder on said shaft 14, an indicating tape arranged over the said feeding cylinder, gear wheels on said shafts in operative engagement with each other, an actuating device on the shaft 18, stops on one of the gears on the other shaft, and a momentum stop-mechanism adapted to be actuated from said actuating mechanism on the shaft 18 for engagement with one of the stops on said gear, substantially as and for the purposes set forth.

4. In a street or station indicator, the combination of a pair of main shafts 14 and 18, a feeding cylinder on said shaft 14, an indicating tape arranged over said feeding cylinder, gear wheels on said shafts in operative engagement with each other, an actuating device on the shaft 18, stops on one of the gears on the other shaft, and a momentum stop-mechanism adapted to be actuated from said actuating mechanism on the shaft 18 for engagement with one of the stops on said gear, consisting, of a pivoted and spring-controlled arm 72, a projection 78 on said arm for engagement with one of the stops on said gear, and an end-portion 79 connected with said arm 72, an extension 81 connected with the actuating device on the shaft carrying the feed cylinder, and a pin 82 connected with said extension 81 normally in engagement with the edge of the end-portion 79 of said arm 72, substantially as and for the purposes set forth.

5. In a street or station indicator, the combination, with the tape-feeding mechanism, and an actuating device, comprising a spring-cylinder having an extension 81 and a pin 82 on said extension, of a momentum stop-mechanism actuated from said extension and its pin, substantially as and for the purposes set forth.

6. In a street or station indicator, the combination, with the tape-feeding mechanism, and an actuating device, comprising a spring-cylinder having an extension 81 and a pin 82 on said extension, of a momentum stop-mechanism actuated from said extension and its pin, consisting, of a pivoted and spring-controlled arm 72, a projection 78 on said arm, and an end-portion 79 connected with said arm 72 and with the edge of which the pin on said extension is in sliding engagement, substantially as and for the purposes set forth.

7. In a street or station indicator, the combination, of a pair of main shafts 14 and 18, a feeding cylinder on said shaft 14, an indicating tape arranged over the said feeding cylinder, gear wheels on said shafts in operative engagement with each other, an actuating device on said shaft 14, stops on one of the gears on said shaft 18, and a momentum stop-mechanism connected with said actuating device on said shaft 14 for engagement with one of the stops on said gear, substantially as and for the purposes set forth.

8. In a street or station indicator, the combination, of a pair of main shafts 14 and 18, a feeding cylinder on said shaft 14, an indicating tape arranged over the said feeding cylinder, gear wheels on said shafts in operative engagement with each other, an actuating device on said shaft 14, stops on one of the gears on said shaft 18, and a momentum stop-mechanism connected with said actuating device on said shaft 14, consisting, of an extension 69 provided with a marginal edge 70 for engagement with one of said stops on said gear, substantially as and for the purposes set forth.

9. In a street or station indicator, the combination, with the tape-feeding mechanism, of an actuating device comprising a spring-cylinder having an extension 69 provided with a marginal edge 70, and means with which said edge 70 is brought in stopping engagement, substantially as and for the purposes set forth.

10. In a street or station indicator, the combination, with the tape-feeding mechanism, of an actuating device comprising a spring-cylinder having an extension 69 provided with a marginal edge 70, and means with which said edge 70 is brought in stopping engagement, consisting of a shaft and a gear on said shaft, and one or more laterally extending stops on said gear, substantially as and for the purposes set forth.

11. The combination, in a street or station indicator, with the tape-feeding mechanism, and an actuating device comprising a spring-cylinder having serrations, of a pivoted holding device normally in slidable non-operative engagement with said serrations, and means for bringing said holding device in holding engagement with said serrations when the actuating device is improperly actuated, substantially as and for the purposes set forth.

12. The combination, in a street or station indicator, with the tape-feeding mechanism, and an actuating device comprising a spring-cylinder having serrations, of a pivoted holding device normally in slidable non-operative engagement with said serrations, and means for bringing said holding device in holding engagement with said serrations when the actuating device is improperly actuated, consisting, of a spring fixed at one end, and a link-connection between the free end-portion of said spring and the pivoted holding device, substantially as and for the purposes set forth.

13. In a street or station indicator, the combination, with the tape-feeding mechanism, comprising, a shaft 14, and a gong, of a trip-device 95 on said shaft, and a striking-mechanism actuated from said trip-device, comprising, a pivoted arm 96 bearing a striker, and a trip 99 having a pair of extensions 100 and 101, said extension 101 being normally in contact with a portion of said arm 96, and said extension 100 being adapted to be engaged by said trip device, substantially as and for the purposes set forth.

14. In a street or station indicator, the combination, with the tape-feeding mechanism, comprising, a shaft 14, and a gong, of a trip-device 95 on said shaft, and a striking-mechanism actuated from said trip-device, comprising, a pivoted arm 96 bearing a striker, and a trip 99 having a pair of extensions 100 and 101, said extension 101 being normally in contact with a portion of said arm 96, and said extension 100 being adapted to be engaged by said trip device, and a pivoted arm 103 having a member 105 and a projection 106 with which the arm 96 is in engagement, and a shoulder 104 on said arm 103 arranged for engagement with a portion of said trip 99, substantially as and for the purposes set forth.

15. In a street or station indicator, a pair of main shafts, a feeding cylinder on one of said shafts, an indicating tape arranged above the said feeding cylinder, an actuating mechanism on the one shaft for rotating both shafts in opposite directions, an actuating mechanism on the other shaft for rotating said shafts in the reverse directions, intermediately placed mechanism for rendering the one actuating mechanism inoperative while the other actuating mechanism is in operative use, and vice versa, and a momentum stop-mechanism connected with and actuated from each actuating mechanism, substantially as and for the purposes set forth.

16. In a street or station indicator, a pair of main shafts, a feeding cylinder on one of said shafts, intermeshing gears on said shafts, an indicating tape arranged above the said feeding cylinder, an actuating cylinder loosely arranged upon each shaft, a holding means connected with each actuating cylinder for engagement with a gear on each shaft, and a momentum stop-mechanism connected with and actuated from each actuating cylinder, substantially as and for the purposes set forth.

17. In a street or station indicator, a pair of main shafts, a feeding cylinder on one of said shafts, intermeshing gears also on said shafts, an indicating tape arranged above said feeding cylinder, an actuating cylinder loosely arranged upon each shaft, a holding means connected with each actuating cylinder in engagement with a gear on each shaft, intermediately placed mechanism for forcing the holding means on the one actuating cylinder out of its holding engagement with the gear on the one shaft, and a momentum stop-mechanism connected with and actuated from each actuating cylinder, substantially as and for the purposes set forth.

18. In the herein described street or station indicator, the combination, with a momentum-stop-mechanism, of a pair of main shafts 14 and 18, a single feeding cylinder on but said shaft 14, said cylinder being provided with feeding sprockets, an indicating tape arranged above said feeding cylinder, eyelets connected with said indicating tape, said eyelets registering with the sprockets on said feeding cylinder, and gears connected with the said shafts 14 and 18 for rotating said feeding cylinder in either direction, geared-take-up and delivery spring-rollers in mesh with the gears of said main shafts, substantially as and for the purposes set forth.

19. In the herein described street or station indicator, the combination, with a momentum-stop-mechanism, of a pair of geared main shafts 14 and 18, a feeding cylinder on said shaft 14, said cylinder being provided with feeding sprockets, an indicating tape arranged above said feeding cylinder, eyelets connected with said indicating tape, said eyelets registering with the sprockets on said feeding cylinder, a system of guide-rolls 26, 27, 28, 29, 30, 31 and 32, over which the tape is arranged, and a pair of spring-rollers 21 and 24 with which the ends of said tape are connected and a gear connected with each spring-roller in mesh with the gears of said main shafts, substantially as and for the purposes set forth.

20. In the herein described street or station indicator, the combination, with a momentum-stop-mechanism, of a pair of main shafts 14 and 18, a feeding cylinder on said shaft 14, said cylinder being provided with feeding sprockets, an indicating tape arranged above said feeding cylinder, eyelets connected with said tape, said eyelets registering with the sprockets on said feeding cylinder, a system of guide rolls over which the tape is arranged, a pair of spring-rollers with which the respective ends of said tape are connected, a gear connected with each of said shafts 14 and 18, and gears connected with the said spring-rollers geared with the gears of said main shafts, respectively, substantially as and for the purposes set forth.

21. In a street or station indicator, a pair of main shafts, a feeding cylinder on one of said shafts, gear-wheels on said shafts in operative engagement with each other, an indicating tape arranged over the said feeding cylinder, an actuating mechanism connected with each shaft acting separately and independently from each other to rotate the feeding cylinder in opposite directions, a momentum-stop-mechanism adapted to be actuated from each shaft, spring-delivery and take-up rolls, and a gear connected with each roll, the respective gears of said rolls being in gear with a gear on said main shafts, substantially as and for the purposes set forth.

22. In a street or station indicator, a pair of main shafts, a feeding cylinder on one of said shafts, gear-wheels on said shafts in operative engagement with each other, sprockets on said cylinder, an indicating tape arranged over the said feeding cylinder, eyelets in said tape registering with the sprockets of said cylinder, an actuating mechanism connected with each shaft acting separately and independently from each other to rotate the feeding cylinder in opposite directions, a momentum-stop-mechanism adapted to be actuated from each shaft, spring-delivery and take-up rolls, and a gear connected with each roll, the respective gears of said rolls being in gear with a gear on said main shafts, substantially as and for the purposes set forth.

In testimony that we claim the invention set forth above we have hereunto set our hands this 25th day of July, 1903.

HARRY E. BEACH.
CHARLES E. GIERDING.

Witnesses:
FREDK. C. FRAENTZEL,
H. HUGO R. FRAENTZEL.